US011865730B2

(12) United States Patent
Kume et al.

(10) Patent No.: US 11,865,730 B2
(45) Date of Patent: Jan. 9, 2024

(54) CAMERA POSITION/ATTITUDE CALIBRATION DEVICE, CAMERA POSITION/ATTITUDE CALIBRATION METHOD, AND ROBOT

(71) Applicant: Hitachi, Ltd., Tokyo (JP)

(72) Inventors: Hideyuki Kume, Tokyo (JP); Ryosuke Miki, Tokyo (JP); So Sasatani, Tokyo (JP); Masaya Itoh, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 17/055,821

(22) PCT Filed: Jun. 5, 2018

(86) PCT No.: PCT/JP2018/021497
§ 371 (c)(1),
(2) Date: Nov. 16, 2020

(87) PCT Pub. No.: WO2019/234814
PCT Pub. Date: Dec. 12, 2019

(65) Prior Publication Data
US 2021/0229290 A1    Jul. 29, 2021

(51) Int. Cl.
*B25J 9/16* (2006.01)
*B25J 9/04* (2006.01)
*B25J 13/08* (2006.01)

(52) U.S. Cl.
CPC ............ *B25J 9/1697* (2013.01); *B25J 9/04* (2013.01); *B25J 13/089* (2013.01)

(58) Field of Classification Search
CPC . B25J 9/1697; B25J 9/04; B25J 13/089; B25J 9/1692; B25J 19/023; G05B 2219/39016; G05B 2219/39024
See application file for complete search history.

(56) References Cited

U.S. PATENT DOCUMENTS

| 4,831,549 A | 5/1989 | Red et al. |
| 2015/0224649 A1 | 8/2015 | Watanabe |

(Continued)

FOREIGN PATENT DOCUMENTS

| JP | 1-159186 A | 6/1989 |
| JP | 6-134691 A | 5/1994 |

(Continued)

OTHER PUBLICATIONS

International Search Report (PCT/ISA/210) issued in PCT Application No. PCT/JP2018/021497 dated Sep. 4, 2018 with English translation (four (4) pages).

(Continued)

*Primary Examiner* — Kira Nguyen
(74) *Attorney, Agent, or Firm* — Crowell & Moring LLP

(57) ABSTRACT

The present invention addresses the problem of providing a camera position/attitude calibration device with which the relative position/attitude of a camera and a robot can be calibrated without interrupting a task which is set in the robot. This camera position/attitude calibration device is characterized by operating a robot and comprising: a task operation planning unit that plans, on the basis of an image captured by a camera installed in a robot and the position/attitude of the robot, an operation for executing a task which has been set in the robot; a calibration operation planning unit that plans, on the basis of the image and the position/attitude of the robot, an operation necessary for calibrating the relative position/attitude of the camera and the robot; and an integration operation planning unit that plans an operation by integrating the task operation plan which has been planned by the task operation planning unit and the calibration operation plan which has been planned by the calibration operation planning unit.

15 Claims, 11 Drawing Sheets

(56) References Cited

U.S. PATENT DOCUMENTS

| | | | |
|---|---|---|---|
| 2016/0059419 A1* | 3/2016 | Suzuki | B25J 9/1692 901/14 |
| 2017/0136626 A1* | 5/2017 | Wang | B25J 9/1697 |
| 2017/0312918 A1 | 11/2017 | Huang et al. | |
| 2018/0194008 A1* | 7/2018 | Namiki | G06T 7/80 |
| 2018/0361589 A1* | 12/2018 | Paquin | B25J 9/1697 |
| 2019/0126487 A1* | 5/2019 | Benaim | G06T 1/0014 |
| 2020/0016757 A1 | 1/2020 | Sakuramoto | |

FOREIGN PATENT DOCUMENTS

| | | |
|---|---|---|
| JP | 6-270020 A | 9/1994 |
| JP | 2007-61979 A | 3/2007 |
| JP | 2012-240174 A | 12/2012 |
| JP | 2015-150636 A | 8/2015 |
| JP | 6301045 B1 | 3/2018 |
| WO | WO 2018/043525 A1 | 8/2018 |

OTHER PUBLICATIONS

Japanese-language Written Opinion (PCT/ISA/237) issued in PCT Application No. PCT/JP2018/021497 dated Sep. 4, 2018 (three (3) pages).

Heller J., et al., Structure-from-Motion Based Hand-Eye Calibration Using L∞ Minimization, IEEE Conference on Computer Vision and Pattern Recognition, 2011, pp. 3497-3503 (seven (7) pages).

Kuffner J., et al., "RRT-Connect: An Efficient Approach to Single-Query Path Planning", In Proc. 2000 IEEE Int'l Conf. on Robotics and Automation, 2000, pp. 1-7 (seven (7) pages).

Japanese-language Office Action issued in Japanese Application No. 2020-523873 dated Nov. 2, 2021 with English translation (five (5) pages).

* cited by examiner

FIG. 4

| ID | IMAGE | POSE P |
|---|---|---|
| 1 | (221) | $P1 = (0, 0, 0, 0, 0, 0)$ POSITION ATTITUDE |
| 2 | (221) | $P2 = (-5, 5, 10, 0, 0, 0)$ |
| ... | ... | ... |
| i | (221) | $Pi = (-10, 10, 30, 10, 0, 0)$ |
| ... | ... | ... |

FIG. 5

| ID | POSE P1 | POSE P2 | ... | POSE $P_j$ | ... | WORK TARGET Wa | WORK TARGET Wb | ... | WORK TARGET $W_i$ | ... |
|---|---|---|---|---|---|---|---|---|---|---|
| 1 | 0, 0, 0, 0, 0, 0 | 10, 0, 0, 0, 0, 0 | ... | 10, 10, 10, 10, 10, 45 | ... | ○ | ○ | ... | ○ | ... |
| 2 | 0, 0, 0, 10, 0, -5 | -10, -5, 5, 0, 10, 10 | ... | 0, 5, 0, 20, -20, 5 | ... | ○ | × | ... | — | ... |
| ... | ... | ... | ... | ... | ... | ... | ... | ... | ... | ... |
| j | 0, 0, 0, 0, 0, 0 | 5, 20, 5, 10, -10, 0 | ... | -5, 10, 20, 5, -5, 5 | ... | — | × | ... | ○ | ... |
| ... | ... | ... | ... | ... | ... | ... | ... | ... | ... | ... |

FIG. 6

| ID | POSE P1 | POSE P2 | ... | POSE $P_k$ | ... | WORK TARGET W1 | WORK TARGET W2 | ... | WORK TARGET $W_k$ | ... |
|---|---|---|---|---|---|---|---|---|---|---|
| 1 | 10, 0, 0, 0, 0, 0 | 10, 10, 10, 10, 10, 45 | ... | — | ... | ○ | ○ | ... | ○ | ... |
| 2 | 0, 5, 0, 20, −20, 5 | — | ... | — | ... | ○ | × | ... | — | ... |
| ... | ... | ... | ... | ... | ... | ... | ... | ... | ... | ... |
| k | 5, 20, 5, 10, −10, 0 | −15, 5, 20, 0, −15, −5 | ... | −5, 10, 20, 5, −5, 5 | ... | — | × | ... | ○ | ... |
| ... | ... | ... | ... | ... | ... | ... | ... | ... | ... | ... |

POSE P     WORK TARGET W

| ID | POSE P1 | POSE P2 | ... | POSE $p_k$ | ... | WORK TARGET W1 | WORK TARGET W2 | ... | WORK TARGET $W_k$ | ... |
|---|---|---|---|---|---|---|---|---|---|---|
| 1 | | | ... | | ... | ○ | ○ | ... | ○ | ... |
| 2 | | | ... | | ... | ○ | × | ... | — | ... |
| ... | ... | ... | ... | ... | ... | ... | ... | ... | ... | ... |
| k | | | ... | | ... | — | × | ... | ○ | ... |
| ... | ... | ... | ... | ... | ... | ... | ... | ... | ... | ... |

| ID | WORK TARGET W | TARGET END TIME | ACHIEVEMENT LEVEL | SCHEDULED END TIME | NUMBER OF FAILURES | ... |
|---|---|---|---|---|---|---|
| 1 | 1 | 10:00 | 50 | 9:55 | 1 | ... |
| 2 | 5 | 10:30 | 0 | 10:30 | 0 | ... |
| ... | ... | ... | ... | ... | ... | ... |
| i | 2 | 17:00 | 0 | 17:00 | 0 | ... |
| ... | ... | ... | ... | ... | ... | ... |

D31: ID, D32: WORK TARGET W, D33: ACHIEVEMENT LEVEL, D34: SCHEDULED END TIME, D35: NUMBER OF FAILURES

TASK OBJECTIVE { ID, WORK TARGET W, TARGET END TIME }
TASK STATUS { ACHIEVEMENT LEVEL, SCHEDULED END TIME, NUMBER OF FAILURES }

| | D30 | D31 | D32 | TB2 D33 | D34 | D35 | |
|---|---|---|---|---|---|---|---|
| ID | PASSENGER | WORK TARGET | TARGET END TIME | ACHIEVEMENT LEVEL | SCHEDULED END TIME | NUMBER OF FAILURES | ... |
| 1 | 0 | 3 | 18:00 | 50 | 17:55 | 0 | ... |
| 2 | 2 | 4 | 9:00 | 0 | 9:00 | 0 | ... |
| ... | ... | ... | ... | ... | ... | ... | ... |
| 1 | 1 | 2 | 17:00 | 0 | 17:00 | 0 | ... |
| ... | ... | ... | ... | ... | ... | ... | ... |

CAMERA POSITION/ATTITUDE CALIBRATION DEVICE, CAMERA POSITION/ATTITUDE CALIBRATION METHOD, AND ROBOT

TECHNICAL FIELD

The present invention relates to, for example, a camera pose calibration device in a camera that is installed to a robot and used, a camera pose calibration method, and a robot.

BACKGROUND ART

In a system using a robot installed with a camera, it is necessary to calibrate a relative pose of the camera and the robot.

Regarding a camera pose calibration method, PTL 1 describes "In a visual sensor correction method for a robot arm of correcting a mounted-state value of a visual sensor on a tip of the robot arm by recognizing a position of work by the visual sensor mounted on the tip of the robot arm, a visual sensor correction method for a robot arm according to the present invention includes: a movement amount determination processing step of determining a movement amount of the tip of the robot arm due to movement of the robot arm in reference coordinates; an image processing step of obtaining a processed image before and after movement by performing image processing on an image of the work acquired by the visual sensor before and after the movement; a position change amount extraction processing step of obtaining a position change amount of the work before and after the movement in association with a temporary parameter, by applying the temporary parameter as an estimated value of the mounted-state value of the visual sensor to the processed image before and after the movement and by converting the processed image before and after the movement to the reference coordinates; a state difference calculation processing step of calculating a difference between the movement amount and the position change amount as a state difference; and a state value extraction processing step of obtaining a plurality of state differences by changing the temporary parameter and repeating the position change amount extraction processing step a plurality of times, and extracting the temporary parameter corresponding to a smallest state difference among a plurality of the state differences, as an mounted-state value of the visual sensor".

CITATION LIST

Patent Literature

PTL 1: JP 2007-61979 A

SUMMARY OF INVENTION

Technical Problem

In the invention described in PTL 1, by using an image of a surrounding environment of the robot captured by the camera installed on the robot, it is possible to calibrate a relative pose of the camera and the robot without requiring manual work such as setting a marker.

However, the image used for the calibration is acquired by causing the robot to execute an operation dedicated to calibration, and a task that is set in the robot is interrupted while the operation dedicated to calibration is performed. Further, it takes time to execute the operation dedicated to calibration. According to this conventional method, a two-step operation for performing the calibration operation is sequentially executed in time series prior to the execution of the task operation.

From the above, an object of the present invention is to provide: a camera pose calibration device, a camera pose calibration method, and a robot, capable of calibrating a relative pose of a camera and a robot without interrupting a task that is set in the robot.

Solution to Problem

From the above, the present invention includes "a camera pose calibration device including a task operation planning unit that plans an operation for executing a task that is set in a robot, from an image captured by a camera installed on the robot and a pose of the robot; a calibration operation planning unit that plans an operation necessary for calibrating a relative pose of the camera and the robot from the image and the pose of the robot; and an integration operation planning unit that plans an operation by integrating a task operation plan planned by the task operation planning unit and a calibration operation plan planned by the calibration operation planning unit. Further, the camera pose calibration device operates the robot.

Further, the present invention includes a "robot operated by the camera pose calibration device".

Further, the present invention includes "a camera pose calibration method including: obtaining a task operation plan in which an operation for executing a task that is set in a robot is planned from an image captured by a camera installed on the robot and a pose of the robot, a calibration operation plan in which an operation necessary for calibrating a relative pose of the camera and the robot is planned from the image and the pose of the robot, an integration operation plan that integrates the task operation plan and the calibration operation plan, and a status and an objective of the task; and calculating a priority of the calibration operation plan with respect to the task operation plan, based on the status and an objective of the task, selecting an operation plan based on the priority, and operating the robot in accordance with the selected operation plan".

Advantageous Effects of Invention

According to the present invention, it is possible to realize a camera pose calibration device capable of calibrating a relative pose of a camera and a robot without interrupting a task that is set in the robot.

BRIEF DESCRIPTION OF DRAWINGS

FIG. 4 is a view showing an example of acquired operation data D1 stored in an acquired operation database DB1.

FIG. 5 is a view showing an example of calibration operation data D2 stored in a calibration operation database DB2.

FIG. 6 is a view showing an example of a calibration operation plan table TB1.

FIG. 8 is a view showing an example of an initial state of the calibration operation plan table TB1.

FIG. 9 is a view showing an example of a task status/objective table TB2.

DESCRIPTION OF EMBODIMENTS

Hereinafter, embodiments of the present invention will be described with reference to the drawings.

First Embodiment

Hereinafter, a camera pose calibration device according to a first embodiment of the present invention will be described with reference to FIGS. 1 to 12.

Figure 3:
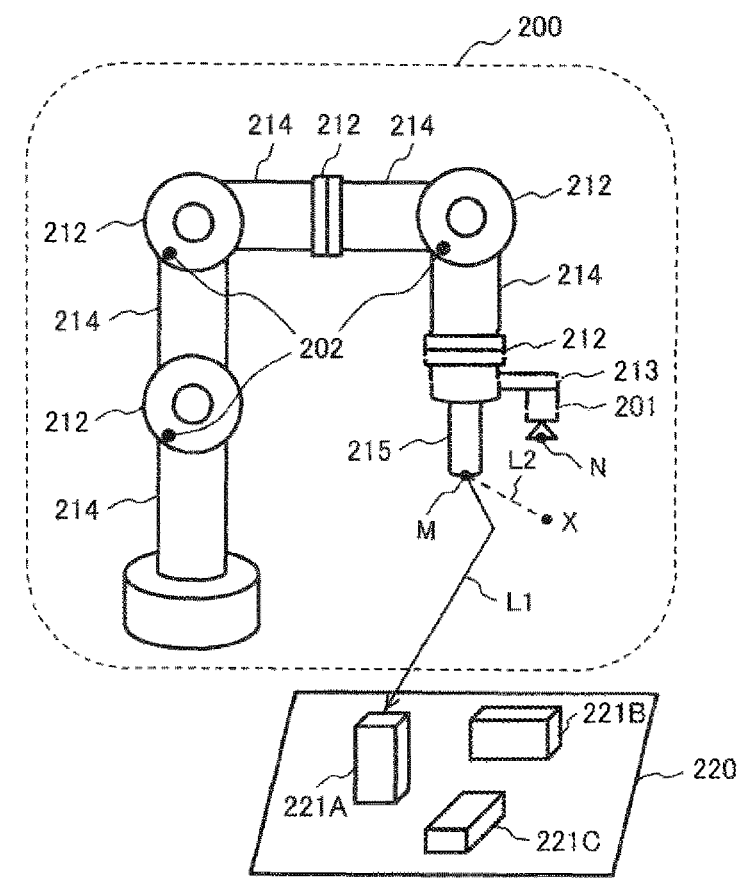
FIG. 3 is a view showing a picking robot as an example of a typical robot to which a camera pose calibration device of the present invention can be applied.

First, an example of a typical robot to which the camera pose calibration device of the present invention can be applied will be described with reference to FIG. 3. In FIG. 3, a picking robot is described as an example of a robot 200.

The picking robot 200 is a robot that picks up works 221 in bulk on a work table 220 one by one and arranges the works 221 in a predetermined place. The picking robot 200 includes a plurality of joints 212 and links 214, and an end effector 215, and a camera 201 serving as a camera device is installed at an appropriate position on the robot 200 by a camera mounting jig 213. Further, each joint 212 of the robot 200 is appropriately provided with a pose sensor 202 that is a sensor to measure an angle of each joint 212.

The picking robot 200 recognizes the work 221 on the work table 220 by the camera 201, and controls an angle of the joint 212 to move the end effector 215 to a position where the work 221 can be lifted. The end effector 215 is, for example, a suction pad or a robot hand, and lifts the work 221 by suctioning or gripping. Note that a configuration such as the number of joints 212 and links 214 of the picking robot 200 may be freely adopted. Further, as the camera 201, an RGB-D camera capable of acquiring a distance in addition to an image may be used.

When the end effector 215 is brought close to the work 221, the picking robot 200 needs to check a pose of the end effector 215. The picking robot 200 uses the pose sensor 202 that is a sensor to measure an angle of each joint 212, to check the pose of the end effector 215 that is important when lifting the work 221, for example. Note that, by measuring the angle of each joint 212, the pose of the end effector 215 can be obtained by solving forward kinematics by a known method, based on a geometric model of the picking robot 200.

In the robot 200, in order to move the robot 200 to a place where it is possible to execute a task (in the example of the picking robot 200 in FIG. 3, taking out and arranging the works 221 in a predetermined place) by using a recognition result by the camera 201, a relative pose of the camera 201 and the robot 200 is required. This is, for example, a relative pose between an installation point N of the camera 201 and a tip position M of the end effector 215 on the robot 200 side in FIG. 3, for example.

However, the relative pose between the camera 201 and the robot 200 may be changed by vibrations during operation of the robot 200, or collision of the camera 201 and the robot 200 with an object existing in a surrounding environment during operation, which may cause an error with respect to an initially set value. Since the error in the relative pose between the camera 201 and the robot 200 is to be an error in the pose of the robot 200, a large error will cause a task failure.

Therefore, a control device of the robot 200 includes a camera pose calibration device that has a function of calibrating the relative pose of the camera 201 and the robot 200. The camera pose calibration device plans an operation of the robot 200 that enables calibration of the pose of the camera without interrupting the task, by planning an operation that integrates an operation plan necessary for task execution and an operation plan necessary for camera pose calibration before the error in the relative pose of the camera 201 and the robot 200 becomes large enough to fail the task.

Figure 2:
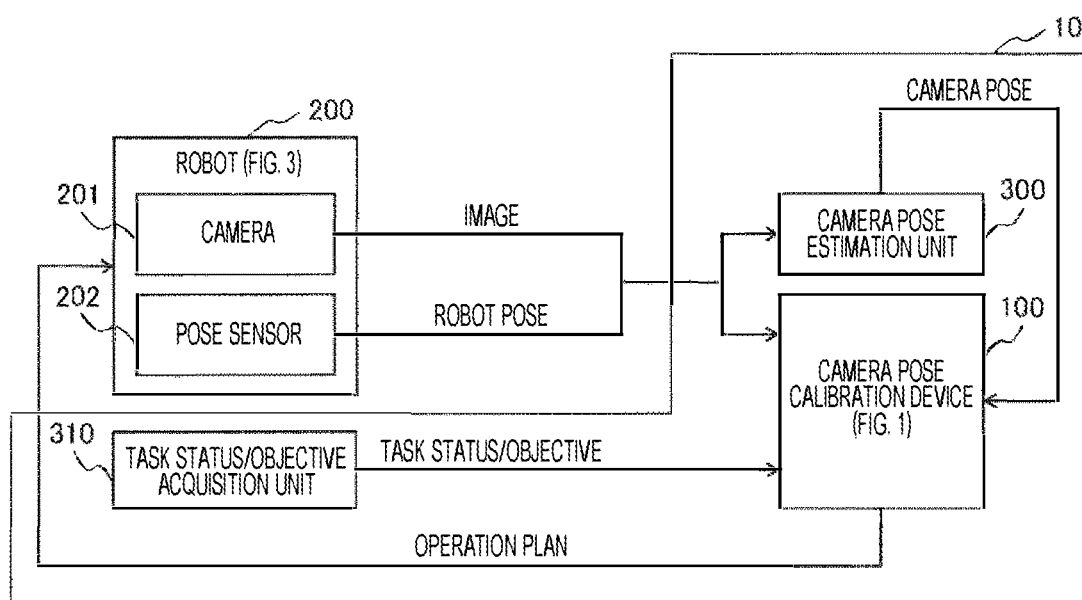
FIG. 2 is a diagram showing a configuration example of a robot system including a robot and a robot control device.

FIG. 2 is a diagram showing a configuration example of a robot system including the robot 200 and a robot control device 10.

In the robot system of FIG. 2, the robot 200 includes at least the camera 201 and the pose sensor 202, which respectively supply image information and robot pose information to the robot control device 10.

In the robot system of FIG. 2, the robot control device 10 is configured to include a camera pose calibration device 100, a task status/objective acquisition unit 310, and a camera pose estimation unit 300.

Hereinafter, the robot system of FIG. 2 will be described in detail. First, the robot 200 is installed with the camera 201 and the pose sensor 202. The camera 201 captures an image of a surrounding environment of the robot 200. The pose sensor 202 outputs a pose of the robot 200.

Note that the pose sensor 202 may be a sensor that directly measures a pose of the robot 200 or a sensor that measures a state of the robot 200. In a case of using a sensor that measures a state of the robot 200, the robot 200 estimates a pose of the robot 200 from the state of the robot 200 and outputs.

Next, the camera pose estimation unit 300 in the robot control device 10 of FIG. 2 estimates a relative pose of the camera 201 and the robot 200 from an image captured by the camera 201 installed on the robot 200 while the robot 200 is operating, and from a pose of the robot 200 acquired by the pose sensor 202 installed on the robot 200.

A problem of estimating the relative pose of the camera 201 and the robot 200 from the image and the pose of the robot 200 is called Hand-Eye calibration. The camera pose estimation unit 300 according to the first embodiment of the present invention preferably use a known Hand-Eye calibration method. However, in the present invention, a method that does not use a marker is suitable, such as J. Heller, M. Havlena, A. Sugimoto, T. Pajdla, Structure-from-motion based hand-eye calibration using $L^\infty$ minimization, IEEE Conf. on Computer Vision and Pattern Recognition, pp. 3497-3503 (2011). The robot 200 executes a task by using a camera pose estimated by the camera pose estimation unit 300.

The task status/objective acquisition unit 310 acquires a status and an objective of a task that is set in the robot 200. Here, as will be described later in detail, the task is taking out and arranging the works 221 in a predetermined place in the example of the picking robot 200 in FIG. 3. The task status is, for example, a type and a shape of the work 221, the number of the works 221 that have been arranged, or the like. Further, the task objective is, for example, the number of works 221 to be arranged, the time for finishing arrangement of the works 221, or the like.

The camera pose calibration device 100 plans an operation of the robot 200 from the image captured by the camera 201 installed on the robot 200, the pose of the robot acquired by the pose sensor 202 installed on the robot 200, and the task status and objective acquired by the task status/objective acquisition unit 310. The robot 200 executes the operation planned by the camera pose calibration device 100. Therefore, the robot includes an actuator (not shown) that drives joints and the like.

As a result, the camera pose calibration device 100 plans an operation of the robot 200 that enables calibration of the pose of the camera without interrupting the task, by planning an operation that integrates an operation plan necessary for task execution and an operation plan necessary for camera pose calibration before an error in the relative pose of the camera 201 and the robot 200 becomes large enough to fail the task.

Figure 1:
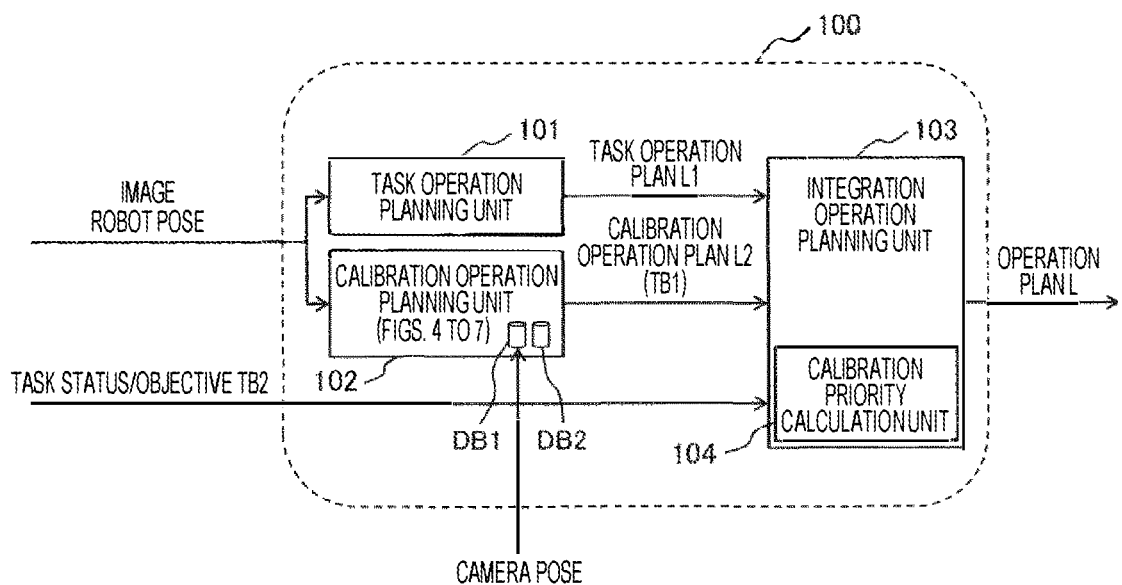
FIG. 1 is a diagram showing a block configuration example of a camera pose calibration device 100.

FIG. 1 is a diagram showing a block configuration example of the camera pose calibration device 100. The camera pose calibration device 100 includes a task operation planning unit 101, a calibration operation planning unit 102, an integration operation planning unit 103, and a calibration priority calculation unit 104.

The task operation planning unit 101 creates a task operation plan L1 that is an operation for executing a task that is set in the robot, from an image and pose data of the robot. The calibration operation planning unit 102 creates a calibration operation plan L2 that is an operation necessary for calibrating a camera pose, from the image and the pose of the robot. The integration operation planning unit 103 creates an operation plan L by integrating the task operation plan L1 planned by the task operation planning unit 101 and the calibration operation plan L2 planned by the calibration operation planning unit 102, based on the status and the objective of the task. The integration operation planning unit 103 includes the calibration priority calculation unit 104. The calibration priority calculation unit 104 calculates a priority of the calibration operation plan L2 with respect to the task operation plan L1.

A function of each unit of the camera pose calibration device 100 shown in FIG. 1 will be described in more detail.

The task operation planning unit 101 creates the task operation plan L1 for executing a task that is set in the robot 200, from an image and pose data of the robot 200. In the picking robot 200, from an image of the work 221 captured by the camera 201 and pose data of the picking robot 200, the task operation planning unit 101 creates the task operation plan L1 that is an operation for lifting and arranging the works 221 at a predetermined place. For example, the task operation planning unit 101 calculates the pose of the picking robot 200 capable of lifting the work 221, by estimating a pose of the work 221 from an image by a known pattern matching method or machine learning method. When a plurality of works 221 are recognized, calculation is performed for a pose corresponding to each work 221, of the picking robot 200 capable of lifting the works 221.

Note that FIG. 3 shows, as L1, an example of an operation locus at a time of the task operation plan of a pose planned by the task operation planning unit 101. Note that FIG. 3 shows, as L1, the task operation plan for a work 221A among the plurality of works 221, and task operation plans for other works are also obtained separately.

The calibration operation planning unit 102 plans an operation (the calibration operation plan L2) necessary for calibrating a camera pose, from an image and a pose of the robot 200. Note that, when the operation necessary for calibrating the camera pose is illustrated in FIG. 3, an image at a point X and pose information of the robot are necessary for calibrating the camera pose. The calibration operation plan L2 is a plan for moving from a current position toward the point X, and newly acquiring an image and pose information of the robot at the point X. Details of a calibration operation planning process will be described later with reference to FIGS. 4 to 7.

The integration operation planning unit 103 plans an operation (the operation plan L) by integrating the task operation plan L1 planned by the task operation planning unit 101 and the calibration operation plan L2 planned by the calibration operation planning unit 102, based on the status and the objective of the task. Details of ah integration operation planning process will be described later with reference to FIGS. 10 and 11.

Note that connection between the robot 200 and the camera pose calibration device 100 may be wired connection such as USB or Ethernet (registered trademark) or wireless connection via a wireless network. Further, the camera pose calibration device 100 may be provided in the robot 200, or may be provided in a PC or a server connected to the robot 200.

Next, contents of processing in the calibration operation planning unit 102 will be specifically described with reference to FIGS. 4 to 7.

The calibration operation planning unit 102 plans the calibration operation plan L2 that is an operation necessary for calibrating a camera pose, from an image and a pose of the robot 200. The calibration operation planning unit 102 includes an acquired operation database DB1 that stores acquired operation data D1 and a calibration operation database DB2 that stores calibration operation data D2. Further, the calibration operation planning unit 102 outputs an operation (the calibration operation plan L2) necessary for calibration as a calibration operation plan table TB1.

First, formation of the acquired operation database DB1 will be described. The acquired operation database DB1 is replenished with stored contents by acquiring images at various poses at an appropriate point during robot operation.

FIG. 4 is a view showing an example of the acquired operation data D1 stored in the acquired operation database DB1. The acquired operation data D1 shown in each row of the acquired operation database DB1 is obtained by storing, as a pair, image data D11 captured by the camera 201 and pose data D12 of the robot 200 at a time of image capturing. To the pair information, an identification code ID is individually assigned. Note that the pose of the robot 200 is expressed by a total of 6 parameters of a position of 3 parameters and an attitude of 3 parameters. Hereinafter, an identifier of each row of the acquired operation database DB1 is defined as i.

Note that, in the example of FIG. 4, at a time of image acquisition of i=1 (ID=1), a pose p1 represented by a total of 6 parameters by a position and an attitude is (0, 0, 0, 0, 0, 0), a pose p2 at a time of image acquisition of i=2 (ID=2) is (−5, 5, 10, 0, 0, 0), and a pose pi at a time of image acquisition of i=i (ID=i) is (−10, 10, 30, 10, 0, 0). According to the acquired operation data D1, pose data at a time of acquiring each image are sequentially accumulated and stored as a pair.

In the acquired operation data D1 in FIG. 4, when there is no change in the relative pose of the camera 201 and the robot 200, the pose data when an image is acquired at the same place as that in the past should show the same value as the pose data acquired in the past. However, this relationship is lost when there is a change in the relative pose of the camera 201 and the robot 200. That is, even if the image is acquired from the same place as that in the past, the pose will be different.

Therefore, when it is considered that the relative pose of the camera 201 and the robot 200 have changed, the acquired operation data D1 stored in the acquired operation database DB1 is to be formed by deleting all images and poses, initializing, and acquiring images again at various poses of the robot 200. For example, if the task fails or the camera 201 and the robot 200 come into contact with an object in a surrounding environment, it is determined that the relative pose of the camera 201 and the robot 200 have changed.

In the picking robot 200, a task failure corresponds to a failure of lifting the work 221. When a suction pad is used as the end effector 215, for example, the success or failure of lifting is determined by a pressure in the suction pad. In addition, for a contact with an object in the surrounding environment of the camera 201 and the robot 200, it is determined that the contact has occurred when a change other than an expected change due to the task of the robot 200 occurs, for example, in a recognition result of the surrounding environment with use of images.

FIG. 5 is a view showing an example of the calibration operation data D2 stored in the calibration operation database DB2. The calibration operation data D2 stored in each row of the calibration operation database DB2 includes a plurality of pose data D21 of the robot 200 used in one calibration that has been performed previously, and task success/failure data D22 for each work target W (the work 221 in FIG. 3) based on the calibration result.

In the success or failure of a task for each work target W, "○" indicates success, "x" indicates failure, and "-" indicates that the task for the corresponding work target W is not attempted. In the picking robot 200, the work target W is the work 221, and the success or failure of the task is the success or failure of lifting the work 221. Hereinafter, an identifier of each row of the calibration operation database DB2 is defined as j, an identifier of a pose included in each row is defined as $p_j$, and an identifier of the work target W is defined as $w_j$. Note that a creating/updating method of the calibration operation database DB2 will be described later.

Specifically explaining the expression in FIG. 5, a series of pose information group D21 of a pose p1 (0, 0, 0, 0, 0, 0), a pose p2 (10, 0, 0, 0, 0, 0), and a pose pj (10, 10, 10, 10, 10, 45) indicated with ID=1 forms a set of patterns. Here, it is shown that all the tasks for work targets Wa, Wb, and Wj have been successful when the camera pose estimation unit 300 in FIG. 2 uses this pose pattern to estimate the pose, calibrate the camera, and execute a task.

Similarly, in the pattern of ID=2, it is shown that the task for the work target Wa has been successful, but the task for the work target Wb has failed, and the task for the work target Wj has not been executed yet, when the camera pose estimation unit 300 in FIG. 2 uses the data of the series of pose information group D21 described here to estimate the pose, calibrate the camera, and execute the task.

In the pattern of ID=j, it is shown that the task for the work target Wj has been successful, but the task for the work target Wb has failed, and the task for the work target Wa has not been executed yet, when the camera pose estimation unit 300 in FIG. 2 uses the data of the series of pose information group D21 described here to estimate the pose, calibrate the camera, and execute the task.

Note that pose data p expressed in FIG. 5 includes the acquired operation data D1 stored in the acquired operation database DB1 in FIG. 4, and data that has not yet been acquired as the pair information of the image and the pose of the robot 200 and has not been stored in the acquired operation data D1 of FIG. 4. In this case, the calibration operation plan table TB1 describes pair information of an image and pose data to be acquired that has been determined and planned, and the calibration operation plan L2 indicates an operation for acquiring the pair information of the image and the pose data (movement to the point X in FIG. 3).

Next, formation of the calibration operation database DB2 will be described. The calibration operation database DB2 is formed by performing a task with use of the estimated relative pose of the camera 201 and the robot 200 and the operation plan by the task operation planning unit 101, determining whether or not the task has been successful, and adding the pose used for calibration and the success or failure of the task to the calibration operation database DB2 when the task for any of the work targets has been successful.

Note that, here, time is required to actually execute the task and determine the success or failure of the task. Therefore, in order to shorten the time for creating the calibration operation database DB2, for example, it is preferable to perform calibration first by using a sufficient number of pairs of the image and the pose (the acquired operation data D1) stored in the acquired operation database DB1, and register in the calibration operation database DB2 by the above method. Specifically, for example, a six-degree-of-freedom space of the work environment is divided into grids at equal intervals, and data is acquired at a pose corresponding to each grid. Next, some pairs are randomly extracted from pairs of the image and the pose (the acquired operation data D1) previously used for the calibration, and calibration is performed using only the extracted pairs. A calibration result when using all pairs, and a calibration result using only the extracted pairs are compared in a manner similar to processing step S540 of the calibration operation planning unit 102 described later. Then, when the two match, the pose included in the extracted pair and a work lifting result in using all the pairs are added to the calibration operation database DB2. This makes it possible to increase types of operations included in the calibration operation database DB2 while reducing the number of trials of actual tasks.

The calibration operation database DB2 is updated when the camera pose estimation unit 300 performs calibration. Specifically, the pose included in the acquired operation database DB1 used by the camera pose estimation unit 300 for the calibration, and the success or failure of the task by using the camera pose estimated by the camera pose estimation unit 300 are added as one row of the calibration operation database DB2.

FIG. 6 is a view showing an example of the calibration operation plan table TB1. Each row of the calibration operation plan table TB1 corresponds to each row of the calibration operation database DB2, and includes a pose that does not exist in the acquired operation database DB1 among a plurality of poses included in each row of the calibration operation database DB2, and includes the success or failure of a task for each work target.

Note that the success or failure of a task for each work target is the same in the calibration operation database DB2 and the calibration operation plan table TB1. Moreover, in poses of the calibration operation plan table TB1, "-" indicates that the pose is not included. That is, in the example of FIG. 6, only one pose is included in the second row of the calibration operation plan table TB1.

Figure 7:
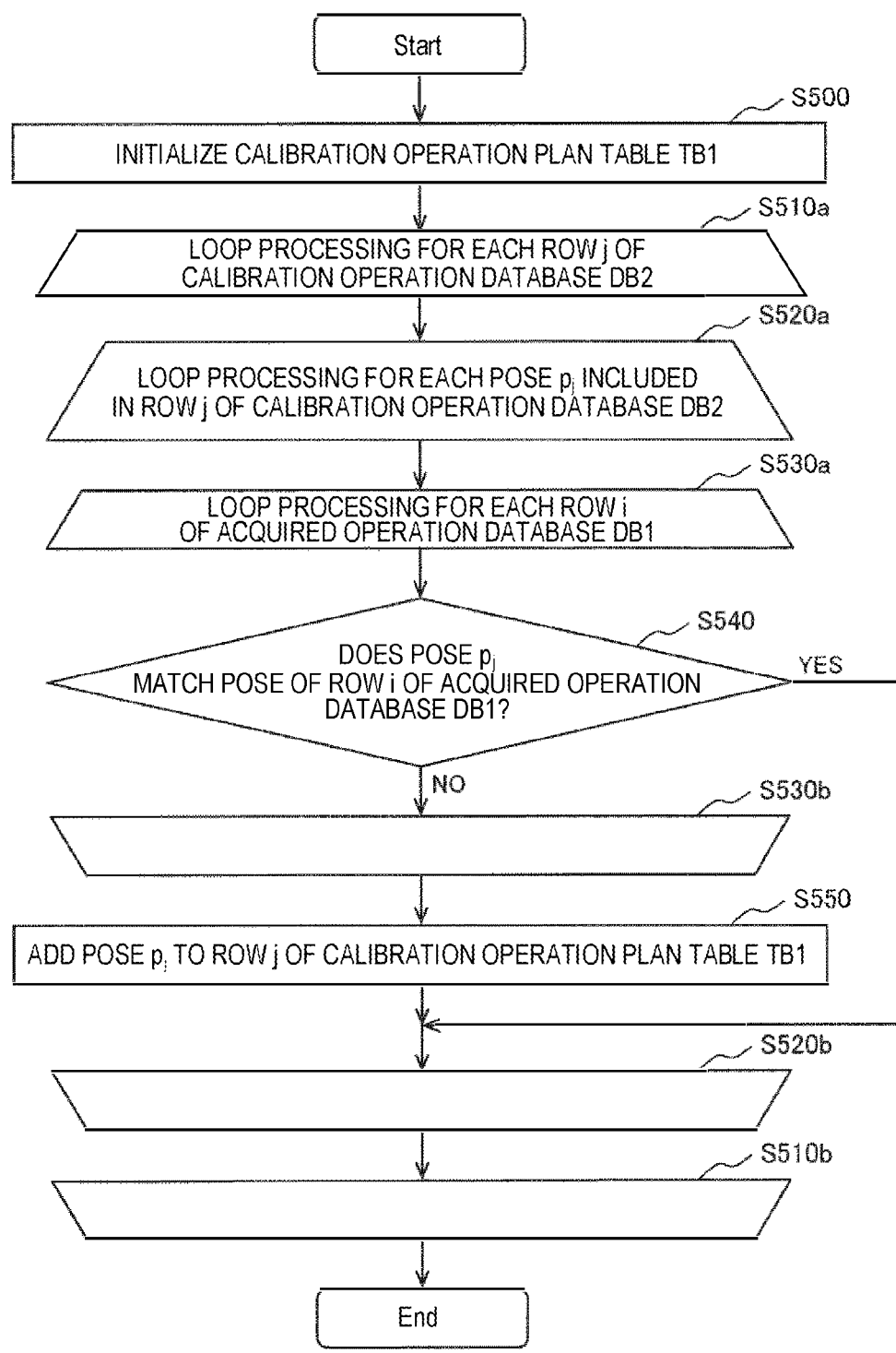
FIG. 7 is a flowchart showing a process executed by a calibration operation planning unit 102.

FIG. 7 is a flowchart showing a process executed by the calibration operation planning unit 102.

In the first processing step S500 in the calibration operation planning unit 102, the calibration operation plan table TB1 is initialized. Specifically, the calibration operation plan table TB1 is created so as to include no information of the pose p and have a blank, and to have the success or failure of a task for each work target W that is the same as that in the calibration operation database DB2. The calibration operation plan table TB1 created at this time has the contents shown in FIG. 8.

In processing step S510a, loop processing for each row j of the calibration operation database DB2 is started. The loop processing is repeatedly executed by changing a condition between processing step S510a and processing step S510b.

In processing step S520a, loop processing for each pose $p_j$ included in the row j of the calibration operation database DB2 is started. The loop processing is repeatedly executed by changing a condition between processing step S520a and processing step S520b.

Information of each pose p in the calibration operation database DB2 of FIG. 5 is to be sequentially called by iterative processing in processing step S510a and processing step S520a. For example, pose information (0, 0, 0, 0, 0, 0) of the pose p1 and ID=1, pose information (10, 0, 0, 0, 0, 0) of the pose p2 and ID=1, pose information (10, 10, 10, 10, 10, 45) of the pose pj and ID=1, pose information (0, 0, 0, 10, 0, −5) of the pose p1 and ID=2, pose information (−10, −5, 5, 0, 10, 10) of the pose p2 and ID=2, and pose information (0, 5, 0, 20, −20, 5) of the pose pj and ID=2 are called in this order.

In processing step S530a, loop processing for each row i of the acquired operation database DB1 is started. The loop processing is repeatedly executed by changing a condition between processing step S530a and processing step S530b. This causes pair information (the image information D11 and the pose information D12) of the acquired operation database DB1 of FIG. 4 to be sequentially called.

In processing step S540, the pose $p_j$ included in the row j of the calibration operation database DB2 is compared with a pose included in a row i of the acquired operation database DB1. The loop processing is continued when the poses do not match. When the poses match, the process leaves the loop processing for each row i of the acquired operation database DB1, and proceeds to the loop processing for each pose $p_j$ included in the row j of the calibration operation database DB2.

In the example above, first, a process of comparing the pose information (0, 0, 0, 0, 0, 0) of the pose p1 and ID=1 in FIG. 5 with the pose information (0, 0, 0, 0, 0, 0) of the pose p and ID=1 in FIG. 4, and then comparing with the pose information (−5, 5, 10, 0, 0, 0) of the pose p and ID=2 is sequentially executed for all combinations.

In matching determination of poses, for example, when a difference between two positions is within a preset threshold value and a difference between two attitudes is within a preset threshold value, it is determined that the two poses match.

In processing step S550, the pose $p_j$ is added to the row j of the calibration operation plan table TB1. The calibration operation plan table TB1 shown in FIG. 6 is finally created in this way. In this case, the acquired operation database DB1 of FIG. 4 is searched for the pose p1 (0, 0, 0, 0, 0, 0) of ID=1 in FIG. 5, and no description is made in the row of ID=1 of the calibration operation plan table TB1 since there is matching data. Further, the acquired operation database DB1 of FIG. 4 is similarly searched for the pose p2 (10, 0, 0, 0, 0, 0) and the pose pj (10, 10, 10, 10, 10, 45), and description is made in the row of ID=1 in the calibration operation plan table TB1 since there is no matching data.

Similarly, the acquired operation database DB1 of FIG. 4 is searched for the pose p1 (0, 0, 0, 10, 0, −5) of the pose p1 and ID=2 and the pose p2 (−10, −5, 5, 0, 10, 10), and no description is made in the row of ID=2 of the calibration operation plan table TB1 since there is matching data. Further, the pose pj (0, 5, 0, 20, −20, 5) that does not exist in the acquired operation database DB1 is described in the row of ID=1 in the calibration operation plan table TB1.

All the pose information p extracted in the calibration operation plan table TB1 in FIG. 6 is information that does not exist in the acquired operation database DB1 in FIG. 4. Therefore, for these non-existent pose data, the acquired operation data D1 that is a pair of an image and a pose is newly acquired, and is replenished and stored in the acquired operation database DB1. Afterward, by estimating a pattern including the acquired pose information p of FIG. 5 with the camera pose estimation unit 300 of FIG. 2, and executing the task by using calibration data, the probability of task success can be improved.

Note that the calibration operation data D2 stored in the calibration operation database DB2 is created when the camera pose calibration device 100 is first used, and then is updated each time the camera pose is calibrated.

Next, contents of processing in the integration operation planning unit 103 will be described. The integration operation planning unit 103 is to create the operation plan L by integrating the task operation plan L1 planned by the task operation planning unit 101 and the calibration operation plan L2 planned by the calibration operation planning unit 102, on the basis of a calibration priority calculated by the calibration priority calculation unit 104 from a status and an objective of a task.

Note that, in order to understand the contents of processing in the integration operation planning unit 103, it is better to understand a calculation method for a calibration priority that is calculated by the calibration priority calculation unit 104. Therefore, first, the calibration priority calculation unit 104 will be described below.

Figure 10:
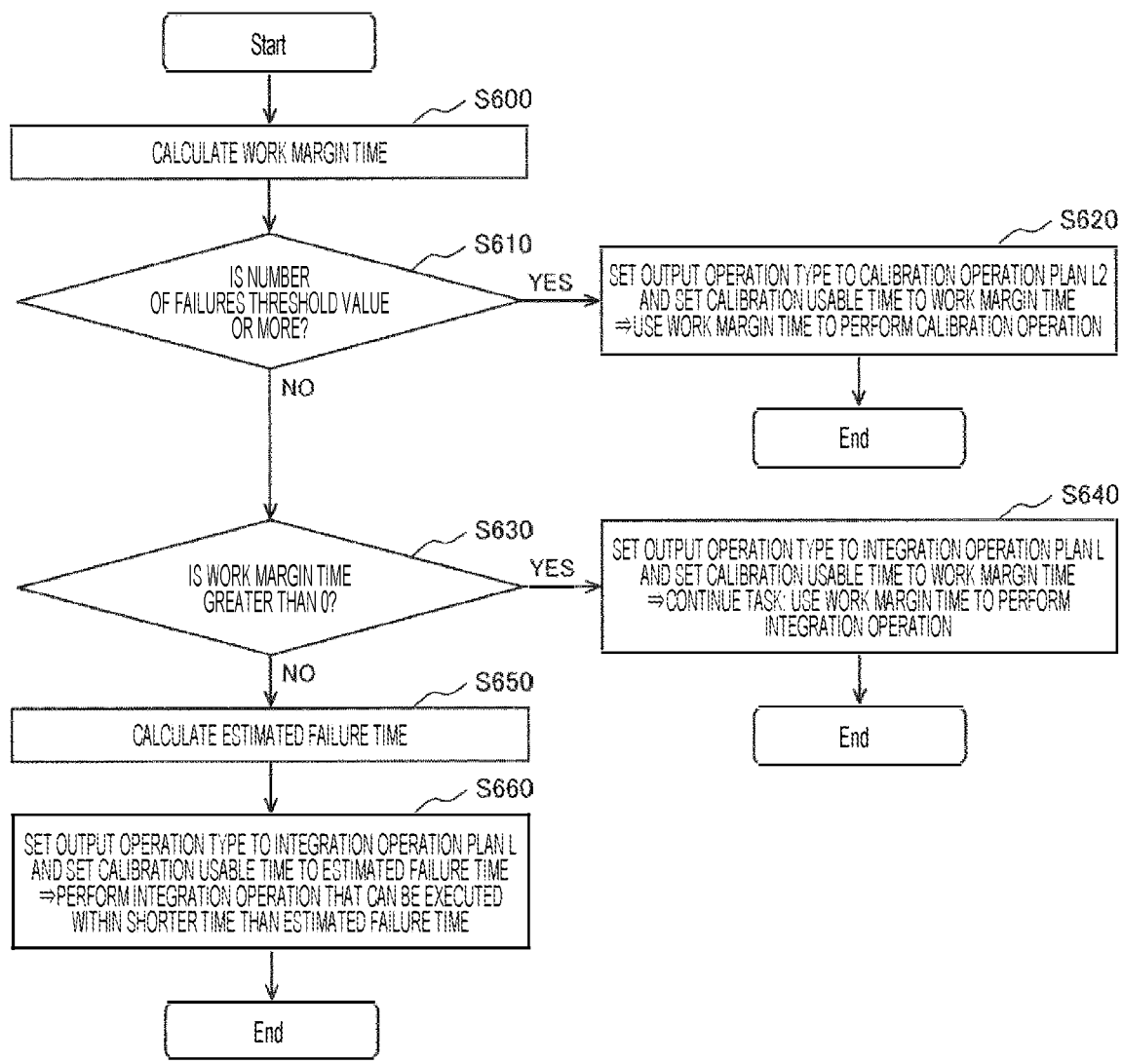
FIG. 10 is a flowchart showing a process executed by a calibration priority calculation unit 104.
Figure 11:
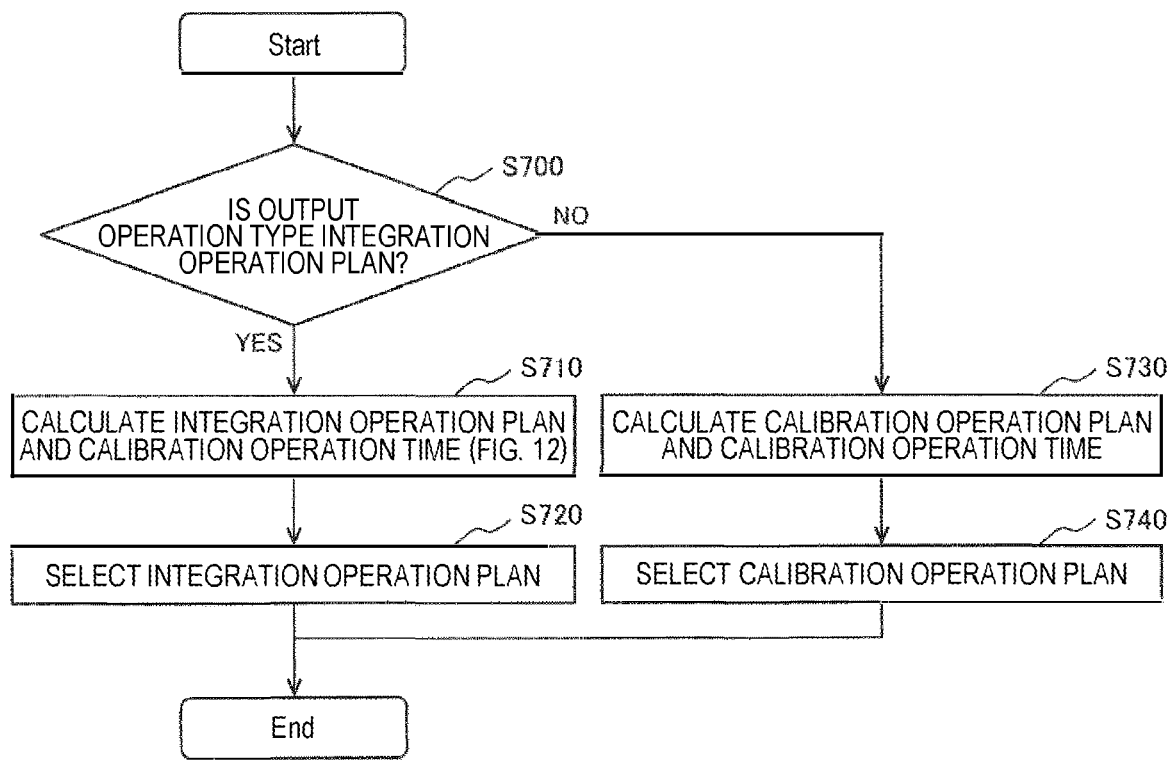
FIG. 11 is a flowchart showing a process executed by an integration operation planning unit 103.

With reference to FIGS. 9, 10, and 11, contents of processing in the calibration priority calculation unit 104 will be described. The calibration priority calculation unit 104 calculates a priority of the calibration operation plan L2 with respect to the task operation plan L1 on the basis of the status and the objective of the task.

The status and the objective of the task are managed by a task status/objective table TB2 provided by the task status/objective acquisition unit 310. FIG. 9 is a view showing an example of the task status/objective table TB2. Each row of the task status/objective table TB2 is the status and the objective of the task processed by the robot 200, and is arranged in the order of processing by the robot 200. For example, the task objective is a management number D31 and an target end time D32 of a work target, and the task status is an achievement level D33, a scheduled end time D34, and a number of task failures D35.

According to the example of the task status/objective table TB2 in FIG. 9, it can be seen that the task with ID=1 should be finished by 10:00 but is scheduled to be finished at 9:55, has about 50% of processing completed at the present time, and has made one failure in the past. Note that all tasks except ID=1 are scheduled to be performed in the future.

The task status/objective table TB2 is updated by the task status/objective acquisition unit 310. For example, in the picking robot 200, the management number D31 and the target end time D32 of the work target, which are the task objective, are inputted by an operator or a production management system.

The achievement level D33 and the number of failures D35, which are the task status, are updated based on a result of a picking operation by the picking robot 200. The scheduled end time D34 is calculated, for example, from a past operation time and an achievement level. The achievement level D33 is calculated from a total number of works and a number of remaining works. Further, for the scheduled end time D34, the time required for the operation may be calculated from the task operation plan L1 outputted by the task operation planning unit 101.

The calibration priority calculation unit 104 calculates, for example, an output operation type and a calibration usable time as the priority of the calibration operation plan L2 with respect to the task operation plan L1. Here, the output operation type is a type of an operation plan outputted by the integration operation planning unit 103, and is the calibration operation plan L2 or the integration operation plan L. Note that the integration operation plan L is a plan for executing the task operation plan L1 and the calibration operation plan L2. The calibration usable time is a time that can be spent for the calibration operation.

FIG. 10 is a flowchart showing a process executed by the calibration priority calculation unit 104. In first processing step S600 of the calibration priority calculation unit 104, a work margin time that is a margin time for a task that is currently set in the robot 200 is calculated. Specifically, the work margin time is a result of subtracting the scheduled end time D34 from the target end time D32 of the task status/objective table TB2 corresponding to the current task. In a case of ID=1 in FIG. 9, five minutes, which is a result of subtracting the scheduled end time D34 (9:55) from the target end time D32 (10:00) of the task status/objective table TB2, is set as the work margin time. However, if the result obtained by subtracting the scheduled end time D34 from the target end time D32 is less than 0, the work margin time is set to 0.

In processing step S610, when the number of failures D35 for the task that is currently set in the robot 200 is equal to or greater than a preset threshold value, the process proceeds to processing step S620, otherwise the process proceeds to processing step S630.

In processing step S620, the output operation type is set to the calibration operation plan L2, and the calibration usable time is set to the work margin time. As a result, it is determined that the task cannot be continued without performing the calibration work, and setting is made so as to perform the calibration operation by using the work margin time. In the above example, setting is made so as to perform the calibration operation within five minutes.

In processing step S630, when the work margin time is greater than 0, the process proceeds to processing step S640, otherwise the process proceeds to processing step S650.

In processing step S640, the output operation type is set to the integration operation plan L, and the calibration usable time is set to the work margin time. This makes setting so as to use the work margin time to perform the integration operation while continuing the task. In the above example, setting is made so as to perform the integration operation by the calibration operation and the task operation so that the task is completed by 10:00.

In processing step S650, when the task is continued without performing the calibration work, an estimated failure time, which is a time estimated to be required for an operation that fails the task, is calculated. For example, the number of task failures in the future is calculated from an achievement level and the number of failures for a task that is currently set in the robot 200. Finally, the estimated failure time is calculated from an average time taken for one operation calculated from past results, or from an average operation time when the task fails, and the number of failures.

In processing step S660, the output operation type is set to the integration operation plan L, and the calibration usable time is set to the estimated failure time. As a result, even when the work margin time is 0, setting is made so as to perform the integration operation that can be executed within a shorter time than the time to be lost due to the task failure, when the task is continued without performing the calibration work.

FIG. 11 is a flowchart showing a process executed by the integration operation planning unit 103. In the first processing step S700 of the integration operation planning unit 103, when the output operation plan calculated by the priority calculation unit 104 is the integration operation plan L, the process proceeds to processing step S710, otherwise the process proceeds to processing step S730.

In processing step S710, for each calibration operation plan included in the calibration operation plan table TB1, the integration operation plan L and a calibration operation time, which is a time to be required more by the integration operation plan L than the task operation plan L1, are calculated. Details of the processing will be described later.

In processing step S720, an integration operation outputted by the integration operation planning unit 103 is selected based on the calibration operation plan table TB1 and based on the integration operation and the calibration operation time corresponding to each calibration operation included in the calibration operation plan table TB1.

For example, first, an integration operation having a calibration operation time shorter than the calibration usable time is set as a selection candidate. Next, by referring to the calibration operation plan table TB1 and the task status/objective table TB2, an integration operation that can succeed a task for the work target W targeted by a task that is furthest ahead is outputted, among the selection candidates. Note that, when there are a plurality of selection candidates that can succeed until the task that is furthest ahead, an integration operation having the shortest calibration operation time is outputted. Further, when there is no selection candidate, the task operation outputted by the task operation planning unit 101 is outputted instead of the integration operation.

In processing step S730, a calibration operation time to be required for the calibration operation is calculated for each calibration operation plan included in the calibration operation plan table TB1. Details of the processing will be described later.

In processing step S740, a calibration operation to be outputted by the integration operation planning unit 103 is selected, based on the calibration operation plan table TB1 and based on the calibration operation time corresponding to each calibration operation included in the calibration operation plan table TB1.

For example, first, a calibration operation having a calibration operation time shorter than the calibration usable time is set as a selection candidate. Next, by referring to the calibration operation plan table TB1 and the task status/objective table TB2, a calibration operation that can succeed a task for the work target targeted by a task that is furthest ahead is outputted, among the selection candidates. Note that, when there are a plurality of selection candidates that can succeed until the task that is furthest ahead, a calibration operation having the shortest calibration operation time is outputted. Further, when there is no selection candidate, a calibration operation with the shortest calibration operation time is outputted, among the calibration operations that can succeed in the current task.

Figure 12:
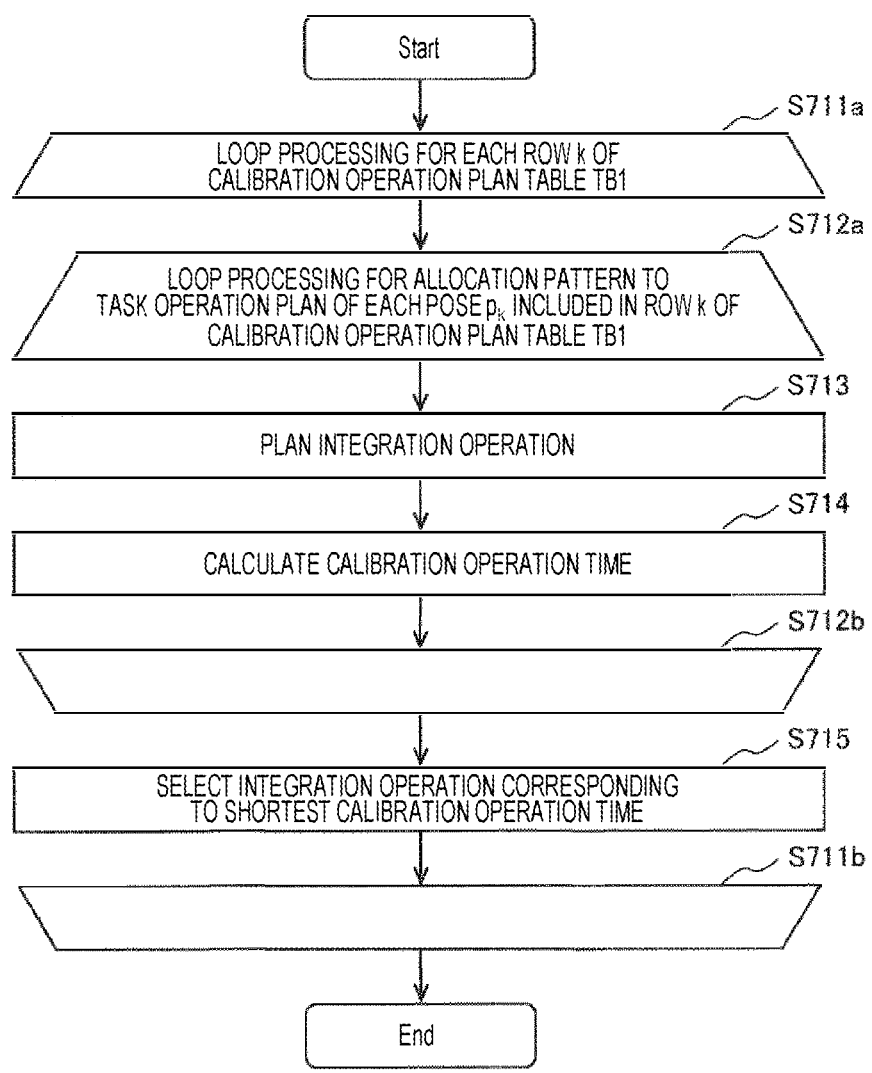
FIG. 12 is a flowchart showing a process executed in processing step S710.

FIG. 12 is a flowchart showing a process executed in processing step S710.

In processing step S711, loop processing for each row k of the calibration operation plan table TB1 is executed between S711a and S711b.

In processing step S712, the loop processing is started between S712a and S712b for an allocation pattern, to the task operation plan, of each pose $p_k$ included in the row k of the calibration operation plan table TB1.

The row k of the calibration operation plan table TB1 includes a plurality of poses $p_k$. Further, the task operation planning unit 101 outputs a plurality of task operation plans. That is, when the plurality of poses $p_k$ are integrated with a plurality of task operation plans, there are a plurality of combination patterns of the poses $p_k$ and the task operation plans. Further, when the plurality of poses $p_k$ are integrated for one task operation plan, there are a plurality of patterns in the order of integrating the poses $p_k$. In processing step S712, loop processing for all these patterns is started.

In processing step S713, an integration operation that integrates the pose $p_k$ included in the calibration operation plan table TB1 and the task operation plan is planned. Specifically, in a pattern to be processed, for each task operation plan to which the pose $p_k$ included in the calibration operation plan table TB1 is allocated, the task operation planning unit 101 plans an operation to start from a reference pose of the robot 200 to reach a pose at which the task outputted as the operation plan can be executed, via the pose $p_k$ included in the calibration operation plan table TB1, by a known operation planning method.

For example, as an operation planning method, J. J. Kuffner, and S. M. LaValle, RRT-connect: An efficient approach to single-query path planning, Int. Conf. on Robotics and Automation, pp. 995-1001 (2000) can be used.

In processing step S714, a time required for the calibration operation is calculated. Specifically, for each task operation plan to which the pose $p_k$ included in the calibration operation plan table TB1 is allocated, a time required when the robot 200 performs the integration operation planned in processing step S713 is calculated based on a specification of the robot 200.

Further, an operation time of the robot 200 without via the calibration operation is calculated, that is, by planning an operation to start from a reference position of the robot 200 to reach a place where the task can be executed, the time required for the operation is calculated.

Next, a difference between the time required when the robot 200 performs the integration operation and the operation time of the robot 200 without via the calibration operation is set as the time required for the calibration operation. Finally, by adding up the time required for the calibration operation calculated for each task operation plan to which the pose $p_k$ included in the calibration operation plan table TB1 is allocated, the calibration operation time for the pattern to be processed is obtained.

In processing step S715, the integration operation is selected corresponding to the shortest calibration operation time among all the calibration operation times calculated by the loop processing, which is started in processing step S712, for an allocation pattern to the task operation plan of each pose $p_k$ included in the k row of the calibration operation plan table TB1.

Returning to FIG. 11, the processing of processing step S730 will be described. In processing step S730, the calibration operation plan and the calibration operation time are calculated by processing similar to processing step S710. However, unlike processing step S710, the calibration operation plan and the task operation plan are not integrated, and the calibration operation plan including only the calibration operation and the calibration operation time are calculated.

Specifically, for each row of the calibration operation plan table TB1, for all patterns in the order of a plurality of poses included in the row, an operation plan for reaching the pose from the reference position of the robot 200 is planned by a known operation planning method, and set as the calibration operation plan. Further, the time required for executing the calibration operation plan based on the specification of the robot 200 is set as the calibration operation time. Finally, a calibration operation corresponding to the shortest calibration operation time is selected for each row of the calibration operation plan table TB1.

According to the above-described first embodiment of the present invention, the following working effects can be obtained.

(1) The camera pose calibration device 100 includes the task operation planning unit 101, the calibration operation planning unit 102, and the integration operation planning unit 103. The task operation planning unit 101 plans an operation for executing a task that is set in the robot 200, from an image and pose data of the robot 200. The calibration operation planning unit 102 plans an operation necessary for calibrating the camera pose from the image and the pose of the robot 200. The integration operation planning unit 103 plans an operation by integrating a task operation plan planned by the task operation planning unit 101 and a calibration operation plan planned by the calibration operation planning unit 102 (FIG. 1). Therefore, the task operation plan and the calibration operation plan are integrated, and a relative pose of the camera 201 and the robot 200 can be calibrated without interrupting the task that is set in the robot 200. In addition, the time to be necessary for calibrating the relative pose of the camera 201 and the robot 200 can be shortened.

(2) The calibration operation planning unit 102 plans an operation necessary for calibration on the basis of the acquired operation database DB1 including the acquired image and pose of the robot 200, and on the basis of the calibration operation database DB2 including the pose of the robot 200 used for the calibration and the success or failure of the task based on the calibration result, and outputs as the calibration operation plan table TB1 (FIGS. 4 to 8). Therefore, the time to be necessary for calibrating the relative pose of the camera 201 and the robot 200 can be shortened by considering the acquired operation.

(3) The integration operation planning unit 103 includes the calibration priority calculation unit 104. The calibration priority calculation unit 104 calculates a priority of the calibration operation plan with respect to the task operation plan on the basis of the task status/objective table TB2 including the status and the objective of the task. The integration operation planning unit 103 plans an operation by integrating a task operation plan planned by the task operation planning unit 101 and a calibration operation plan planned by the calibration operation planning unit 102 (FIGS. 9 to 12), on the basis of the priority of the calibration operation plan calculated by the calibration priority calculation unit 104. Therefore, by calibrating the relative pose of the camera 201 and the robot 200 while considering the status and the objective of the task, the robot 200 can perform the given task in accordance with the objective.

(4) The calibration priority calculation unit 104 calculates a work margin time that is a margin time for the task, from the target end time and the scheduled end time of the task, and calculates, as the priority of the calibration operation plan, a calibration usable time that is a time that can be spent for the calibration operation, on the basis of the work margin (FIGS. 9 and 10). Therefore, by calibrating the relative pose of the camera 201 and the robot 200 while considering the work margin time, the robot 200 can perform the given task in accordance with the objective.

(5) The calibration priority calculation unit 104 calculates, as the priority of the calibration operation plan, an output operation type that is a type of the operation plan outputted by the integration operation planning unit 103, and the calibration usable time, on the basis of the number of failures for the task that is set in the robot 200 (FIGS. 9 and 10). Therefore, while considering the number of failures for the task, by performing the calibration operation when there are many failures and calibrating the relative pose of the camera 201 and the robot 200, the robot 200 can perform the given task in accordance with the objective.

(6) In a case where the task is continued without performing calibration work based on the achievement level and the number of failures for the task that is set in the robot 200, the calibration priority calculation unit 104 calculates an estimated failure time that is a time estimated to be spent for an operation that fails the task, and calculates, as the priority of the calibration operation plan, a calibration usable time that is a time that can be spent for the calibration operation, on the basis of the estimated failure time (FIGS. 9 and 10). Therefore, considering the estimated failure time, when the camera pose can be calibrated within a shorter time than the estimated failure time, the task can be completed within a shorter time than when the calibration is not performed, by calibrating the camera pose.

(7) The integration operation planning unit 103 integrates each task operation plan planned by the task operation planning unit 101 and each calibration operation plan planned by the calibration operation planning unit 102 into a plurality of combination patterns, and the integration operation planning unit 103 selects, as an integration operation for each calibration operation plan, an integration operation with the shortest calibration operation time that is an operation time added to the task operation plan by the integration (FIGS. 11 and 12). Therefore, the time to be necessary for calibrating the relative pose of the camera 201 and the robot 200 can be shortened.

(8) The integration operation planning unit 103 selects the integration operation on the basis of the success or failure of the task based on a calibration result included in the calibration operation database DB1 and a schedule of a work target that is included in the task status/objective table TB2 and given as a task to the robot 200 (FIG. 9, FIG. 11). Therefore, by considering the schedule of the work target, the task can be completed within a short time in the long term.

Note that the following modified embodiment can be further adopted in realizing the first embodiment of the present invention.

First, when the camera pose calibration device 100 is first used, the calibration operation database DB2 has been created by acquiring images with various poses of the robot 200 and performing a task based on the calibration result using the acquired image and the pose of the robot 200. However, the method of creating the calibration operation database DB2 is not limited to this.

In addition, the integration operation planning unit may integrate each task operation plan planned by the task operation planning unit and each calibration operation plan planned by the calibration operation planning unit with a plurality of combination patterns, and may select, as an integration operation for each calibration operation plan, an integration operation with the shortest calibration operation time, which is an operation time added to the task operation plan by the integration.

Further, the integration operation planning unit may select the integration operation by using a calibration operation database and an objective of the plurality of scheduled tasks.

Moreover, the calibration operation database may be created by simulation.

The calibration operation database DB2 may be created by simulation without operating the robot 200. For example, the calibration operation database DB2 may be created by a method similar to a case of using actual data, by creating a simulation environment from a configuration and arrangement of the robot 200, a shape of the work target, or the like, and virtually acquiring a plurality of pairs of the image and the pose of the robot 200. Further, in order to match the simulation and the real environment, it is possible to acquire an image of the actual work environment, create a simulation environment that simulates the real environment by using a 3D restoration method using an image or an object recognition method, and use to create the calibration operation database DB2.

According to the above-described first modification, the following working effects can be obtained. That is, the camera pose calibration device 100 creates the calibration operation database DB2 by simulation. Therefore, since the time required to create the calibration operation database DB2 is shortened, it is possible to start using the camera pose calibration device early.

Second Embodiment

Hereinafter, a camera pose calibration device according to a second embodiment of the present invention will be described with reference to FIGS. 13 to 15. Note that, in the following explanation, the same reference numerals are given to the same constituent elements as those of the first embodiment, and the differences will mainly be described. The points not specifically described are the same as those of the first embodiment. This embodiment is targeted for a case where a robot 200 is an autonomous driving vehicle.

A configuration of the camera pose calibration device according to the second embodiment is basically the same as that of FIG. 1, and is different only in processing of the priority calculation unit 104.

In the second embodiment, the robot 200 is an autonomous driving vehicle. FIG. 13 is a view showing a situation in which an autonomous driving vehicle 230 is parked in a parking space. The autonomous driving vehicle 230 automatically travels to a target pose 241, which is a parking space in a parking lot. The autonomous driving vehicle 230 is installed with a camera 231. By recognizing a surrounding environment with the camera 231 and controlling the autonomous driving vehicle 230, the autonomous driving vehicle 230 is moved to the target pose 241.

Figures 13, 14:
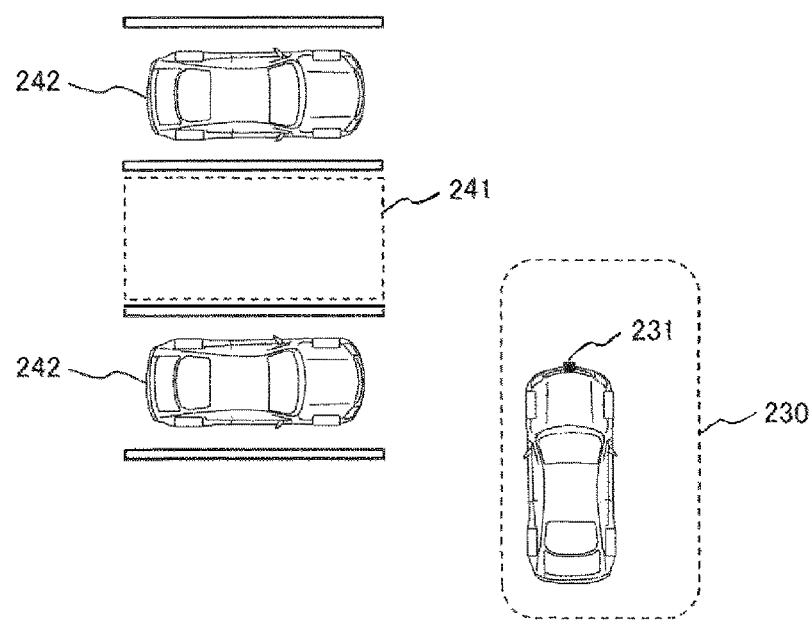
FIG. 13 is a view showing a situation where an autonomous driving vehicle 230 is parked in a parking space.
FIG. 14 is a view showing an example of a task status/objective table TB2 in the autonomous driving vehicle 230.

In the example shown in FIG. 13, the autonomous driving vehicle 230 sets the target pose 241 by recognizing a parking space in which another vehicle 242 is not parked, and realizes automatic parking by automatically traveling. Note that any configuration may be adopted for the autonomous driving vehicle 230. For example, the autonomous driving vehicle 230 may be installed with a plurality of cameras 231, or may be installed with other sensors such as LiDAR and radar. Further, the autonomous driving vehicle 230 may also communicate with a monitoring center with a communication device.

In the autonomous driving vehicle 230, the pose sensor 202 in the robot of FIG. 2 is, for example, a sensor that measures a rotation amount of a tire and a steering wheel. As a pose of the autonomous driving vehicle 230, a pose around a rear wheel axle, which is important for vehicle control, is used. By measuring the rotation amount of the tire and the steering wheel, the pose of the autonomous driving vehicle 230 can be obtained by wheel odometry, which is a known method, based on a geometric model of the autonomous driving vehicle 230.

In the autonomous driving vehicle 230, the set task is traveling to the target pose 241. A task status is, for example, a type and shape of the target pose 241, a distance to the target pose 241, and the like. A task objective is, for example, a time to reach the target pose 241.

In the autonomous driving vehicle 230, the task operation planning unit 101 in FIG. 1 plans an operation for moving the autonomous driving vehicle 230 to the target pose 241, based on an image of a surrounding environment captured by the camera 231 and pose data of the autonomous driving vehicle 230. For example, the task operation planning unit 101 calculates a pose that enables parking and sets as the target pose 241, by estimating a pose of the parking space with a known pattern matching method and machine learning method.

When a plurality of parking spaces are recognized, a target pose that enables parking corresponding to each parking space is set as the target pose 241. Note that the target pose 241 is not limited to the parking space, and may be any pose desired by a user. Further, the target pose 241 may be calculated using other sensors or map information, in addition to the camera 231.

Next, an operation and processing content of the calibration priority calculation unit 104 when the robot is the autonomous driving vehicle 230 will be described with reference to FIGS. 14 and 15.

FIG. 14 is a view showing an example of a task status/objective table TB2 in the autonomous driving vehicle 230. A number of passengers D30 is added to items of the task status/objective table TB2 of the first embodiment shown in FIG. 9.

In the task status/objective table TB2 of the autonomous driving vehicle 230, a work target D31 is the target pose 241. Further, a task failure D35 corresponds to a failure in traveling to the target pose 241. For example, it is determined as a failure when a driver senses a risk of contact with an object in the surrounding environment and applies a brake. In addition, when the risk of contact with an object in the surrounding environment is detected by an ultrasonic sensor or the like, it is determined as a failure.

The task status/objective table TB2 in FIG. 14 is updated by the task status/objective acquisition unit 310. For example, in the autonomous driving vehicle 230, a management number of a work target and a target end time D32, which are the task objective, are inputted by a user or set by an automatic driving system. An achievement level D33 and the number of failures D35, which are the task status, are updated based on a traveling result by the autonomous driving vehicle 230. A scheduled end time D34 is calculated, for example, from a past operation time and an achievement level. The achievement level D33 is calculated from a distance to the target pose 241 and a traveling distance. Further, for the scheduled end time D34, the time required for the operation may be calculated from an operation plan outputted by the task operation planning unit 101.

Figure 15:
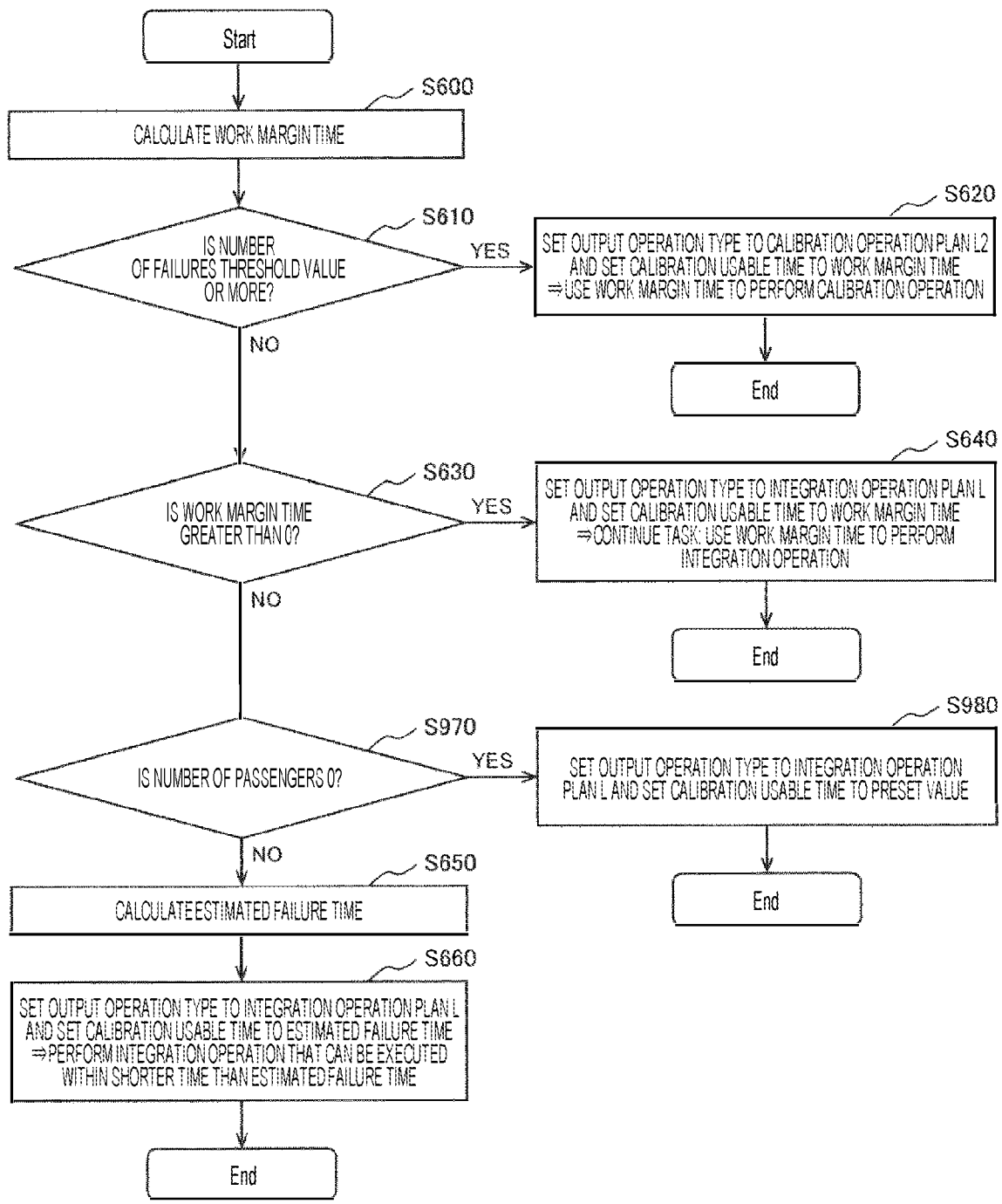
FIG. 15 is a flowchart showing a process executed by a calibration priority calculation unit 104.

FIG. 15 is a flowchart showing a process executed by the calibration priority calculation unit 104. In the second embodiment, processing step S970 and processing step S980 are added to the flowchart of FIG. 10 executed by the calibration priority calculation unit 104 of the first embodiment shown in FIG. 1.

In processing step S970, when the number of passengers is 0, the process proceeds to processing step S980, otherwise the process proceeds to processing step S650.

In processing step S980, an output operation type is set to an integration operation plan L, and a calibration usable time is set to a preset value. When the number of passengers is 0, by setting the calibration usable time to the preset value, the calibration work is prioritized over finishing the task at the target end time.

According to the above-described second embodiment, the following working effects can be obtained. That is, the calibration priority calculation unit 104 calculates, as the priority of the calibration operation plan, the calibration usable time that is the time that can be spent for the calibration operation, on the basis the number of passengers of the autonomous driving vehicle 230. Therefore, by performing the calibration when the number of passengers is 0, the calibration operation time when there is a passenger can be shortened, which can reduce the burden on the passenger due to the calibration.

Note that the present invention is not limited to the above embodiments, and various modifications may be included. For example, the above embodiments have been illustrated in detail to facilitate description for easy understanding of the present invention, and are not necessarily limited to the embodiments that include all the illustrated configurations. Other aspects considered within the technical idea of the present invention are also included within the scope of the present invention. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, or added with another configuration. In addition, each of the above-described configurations, functions, processing parts, processing units, and the like may be realized by hardware, for example, by designing part or all of them with an integrated circuit or the like. In addition, each of the above-described configurations, functions, and the like may be realized by software by interpreting and executing a program in which a processor realizes each function. Information such as a program, a table, and a file for realizing each function can be placed in a recording device such as a memory, a hard disk, or a solid state drive (SSD), or in a recording medium such as an IC card, an SD card, or a DVD.

REFERENCE SIGNS LIST 100 camera pose calibration device
101 task operation planning unit 102 calibration operation planning unit
103 integration operation planning unit
104 calibration priority calculation unit
200 robot (picking robot)
201 camera
202 pose sensor
220 work table
230 autonomous driving vehicle
300 camera pose estimation unit
310 task status/objective acquisition unit
DB1 acquired operation database
DB2 calibration operation database
TB1 calibration operation plan table
TB2 task status/objective table

The invention claimed is:

1. A camera pose calibration device comprising:
a task operation planning unit that plans a task operation plan for executing a task that is set in a robot, from an image captured by a camera installed on the robot and a pose of the robot;
a calibration operation planning unit that plans a calibration operation plan necessary for calibrating a relative pose of the camera and the robot from the image and the pose of the robot; and
an integration operation planning unit that plans an integrated operation plan by integrating the task operation plan planned by the task operation planning unit and the calibration operation plan planned by the calibration operation planning unit, wherein
the camera pose calibration device operates the robot.

2. The camera pose calibration device according to claim 1, wherein the calibration operation planning unit plans the calibration operation plan by using acquired operation data including a plurality of sets of the image and the pose of the robot that have been acquired, and calibration operation data including a plurality of sets of the pose of the robot and success or failure of the task based on a calibration result using the pose of the robot.

3. The camera pose calibration device according to claim 1, further comprising:
a task status/objective acquisition unit that gives a status and an objective of the task; and
a calibration priority calculation unit that calculates a priority of the calibration operation plan with respect to the task operation plan, based on the status and an objective of the task from the task status/objective acquisition unit, wherein
the integration operation planning unit plans the integrated operation plan by integrating the task operation plan and the calibration operation plan, based on the priority calculated by the calibration priority calculation unit.

4. The camera pose calibration device according to claim 3, wherein the calibration priority calculation unit uses a work margin time calculated from a target end time and a scheduled end time of the task, to calculate, as the priority, a calibration usable time that is a time that can be spent for a calibration operation.

5. The camera pose calibration device according to claim 3, wherein the calibration priority calculation unit uses a number of failures for the task, to calculate, as the priority, an output operation type that is a type of the integrated operation plan outputted by the integration operation planning unit, and the calibration usable time that is a time that can be spent for the calibration operation.

6. The camera pose calibration device according to claim 3, wherein in a case where the task is continued without performing calibration work based on an achievement level and a number of failures for the task, the calibration priority calculation unit calculates an estimated failure time that is a time estimated to be spent for an operation that fails the task, and the calibration priority calculation unit uses the estimated failure time to calculate, as the priority, the calibration usable time that is a time that can be spent for the calibration operation.

7. The camera pose calibration device according to claim 3, wherein the calibration priority calculation unit calculates, as the priority, the calibration usable time that is a time that can be spent for a calibration operation, based on a number of passengers of the robot.

8. The camera pose calibration device according to claim 1, wherein the integration operation planning unit integrates each task operation plan planned by the task operation planning unit and each calibration operation plan planned by the calibration operation planning unit with a plurality of combination patterns, and the integration operation planning unit selects, as an integration operation for each calibration operation plan, an integration operation with a shortest calibration operation time that is an operation time added to the task operation plan by integration.

9. The camera pose calibration device according to claim 1, wherein the integration operation planning unit selects an integration operation by using the calibration operation plan and an objective of a plurality of the tasks that have been scheduled.

10. The camera pose calibration device according to claim 1, wherein the calibration operation plan is created by simulation.

11. A robot operated by the camera pose calibration device according to claim 1.

12. A camera pose calibration method comprising:
creating a task operation plan in which an operation for executing a task that is set in a robot is planned from an image captured by a camera installed on the robot and a pose of the robot;
creating a calibration operation plan in which an operation necessary for calibrating a relative pose of the camera and the robot is planned from the image and the pose of the robot;
creating an integration operation plan that integrates the task operation plan and the calibration operation plan based on a status and an objective of the task;
calculating a priority of the calibration operation plan with respect to the task operation plan based on the status and the objective of the task;
selecting an operation plan based on the priority; and
operating the robot in accordance with the selected operation plan.

13. The camera pose calibration method according to claim 12, wherein in a case where the task fails, the calibration operation plan is prioritized, and a calibration operation is performed by using a work margin time calculated from a target end time and a scheduled end time of the task.

14. The camera pose calibration method according to claim 12, wherein in a case where there is a work margin time calculated from a target end time and a scheduled end time of the task, the integration operation plan is prioritized and a task is continuously executed.

15. The camera pose calibration method according to claim 12, wherein in a case where there is no work margin time calculated from a target end time and a scheduled end time of the task, when the task is continued, an estimated failure time that is a time estimated to be spent for an operation that fails the task is calculated, and the integration operation plan that can be executed within a shorter time than the estimated failure time is executed.

* * * * *